United States Patent
Marzahn et al.

(10) Patent No.: US 10,453,591 B2
(45) Date of Patent: Oct. 22, 2019

(54) END CLOSURE OF A SUPERCONDUCTIVE ELECTRIC CABLE

(71) Applicant: NEXANS, Paris (FR)

(72) Inventors: Erik Marzahn, Langenhagen (DE); Mark Stemmle, Hannover (DE)

(73) Assignee: NEXANS, Courbevoie (FR)

( * ) Notice: Subject to any disclaimer, the term of this patent is extended or adjusted under 35 U.S.C. 154(b) by 196 days.

(21) Appl. No.: 14/632,170

(22) Filed: Feb. 26, 2015

(65) Prior Publication Data

US 2016/0071631 A1 Mar. 10, 2016

(30) Foreign Application Priority Data

Mar. 11, 2014 (EP) .................................. 14305346

(51) Int. Cl.
*H01B 12/00* (2006.01)
*H01B 12/14* (2006.01)
(Continued)

(52) U.S. Cl.
CPC .............. *H01B 12/16* (2013.01); *H01R 4/68* (2013.01); *H01R 4/70* (2013.01); *F17C 3/085* (2013.01); *Y02E 40/648* (2013.01)

(58) Field of Classification Search
CPC ......... H01L 12/00; H01L 12/14; H01L 12/16; H01L 12/02; F25B 9/00; F25B 9/002;
(Continued)

(56) References Cited

U.S. PATENT DOCUMENTS 3,618,186 A * 11/1971 Krefft ...................... H01G 4/02
29/25.41
5,945,888 A * 8/1999 Weinert .................... H01P 7/10
333/17.1
(Continued)

FOREIGN PATENT DOCUMENTS

DE 202004007187 8/2004
JP 08196030 A * 7/1996
(Continued)

OTHER PUBLICATIONS

Machine Translation of JP 08196030 A, Miura, Daisuke, Jul. 1996.*
Search Report dated 2014.
Search Report dated Sep. 10, 2018.

*Primary Examiner* — Frantz F Jules
*Assistant Examiner* — Erik Mendoza-Wilkenfel
(74) *Attorney, Agent, or Firm* — Sofer & Haroun, LLP

(57) ABSTRACT

An end closure for a superconductive electric cable which has at least one superconductive conductor which is surrounded by a tubular cryostat serving for conducting a cooling agent, which at its end is surrounded by a housing. The housing (G) has two walls (7, 8) which are separated from each other by an intermediate space (9) and having insulating material, wherein a thermal insulation containing gas is placed in the intermediate space. The pressure in the intermediate space (9) of the housing (G) is adjusted to a value of between $10^{-9}$ mbar and 1000 mbar and, connected to the intermediate space (9) are a pressure measuring device (12) and a vacuum pump (11) which serve for adjusting the pressure prevailing in the intermediate space (9) of the housing (G).

7 Claims, 1 Drawing Sheet

(51) Int. Cl.
*H01B 12/16* (2006.01)
*F25B 9/00* (2006.01)
*B01D 8/00* (2006.01)
*F17C 13/00* (2006.01)
*F04B 37/08* (2006.01)
*H01R 4/68* (2006.01)
*H01R 4/70* (2006.01)
*F17C 3/08* (2006.01)

(58) Field of Classification Search
CPC ........ F25B 9/12; F17C 13/006; F17C 13/007; F17C 2203/00375; F17C 2203/00383; F17C 2203/0387; F17C 2203/0375; F17C 2203/0379; F17C 2203/0391–0395; Y02E 40/64; Y02E 40/641; Y02E 40/645; Y02E 40/647; F04B 37/08; F04B 37/085; B01D 8/00; H01B 12/00; H01B 12/02
See application file for complete search history.

(56) References Cited

U.S. PATENT DOCUMENTS

| | | | | |
|---|---|---|---|---|
| 6,443,225 B1 * | 9/2002 | Nakanou | ................ | F17C 3/085 |
| | | | | 165/104.32 |
| 7,297,055 B2 | 11/2007 | Sar | | |
| 7,301,157 B2 | 11/2007 | Buijsse et al. | | |
| 8,633,381 B2 * | 1/2014 | Lallouet | ................ | H02G 15/34 |
| | | | | 174/125.1 |
| 9,331,468 B2 * | 5/2016 | Traeholt | ................ | H02G 15/34 |
| 2003/0047445 A1 * | 3/2003 | Tojo | ........................ | C25B 15/02 |
| | | | | 204/243.1 |
| 2005/0204752 A1 * | 9/2005 | Sar | ........................ | F17C 3/08 |
| | | | | 62/55.5 |
| 2007/0080291 A1 * | 4/2007 | Buijsse | .................... | H01J 37/18 |
| | | | | 250/311 |
| 2008/0223735 A1 * | 9/2008 | Ishikawa | ............ | B29C 65/1435 |
| | | | | 206/0.6 |
| 2008/0307798 A1 * | 12/2008 | Luo | .......................... | F17C 3/02 |
| | | | | 62/49.1 |
| 2009/0247411 A1 | 10/2009 | King et al. | | |
| 2010/0029488 A1 * | 2/2010 | Schmidt | ................. | F16L 59/141 |
| | | | | 505/220 |
| 2010/0309590 A1 * | 12/2010 | Darmann | .................. | H01F 6/00 |
| | | | | 361/19 |
| 2011/0152103 A1 * | 6/2011 | Soika | ..................... | H02G 15/34 |
| | | | | 505/160 |
| 2011/0319262 A1 | 12/2011 | Oyama et al. | | |
| 2012/0091144 A1 * | 4/2012 | Baumgartner | ......... | H01B 12/16 |
| | | | | 220/560.04 |
| 2012/0186854 A1 * | 7/2012 | Choi | ......................... | H01R 4/68 |
| | | | | 174/22 R |
| 2012/0255313 A1 * | 10/2012 | Katkov | .................... | F25D 3/102 |
| | | | | 62/51.1 |
| 2012/0255314 A1 * | 10/2012 | Matsui | ..................... | F04B 37/08 |
| | | | | 62/55.5 |
| 2014/0027141 A1 * | 1/2014 | Yagi | ......................... | H01R 4/68 |
| | | | | 174/15.5 |

FOREIGN PATENT DOCUMENTS

| | | |
|---|---|---|
| KR | 20100092106 | 8/2010 |
| RU | 2367076 | 2/2009 |

* cited by examiner

END CLOSURE OF A SUPERCONDUCTIVE ELECTRIC CABLE

RELATED APPLICATION

This applications claims the benefit of priority from European Patent Application No. 14 305 346.0, filed on Mar. 11, 2014, the entirety of which is incorporated by reference.

BACKGROUND

Field of the Invention

The invention relates to an end closure of a superconductive electric cable which has at least one superconductive conductor which is surrounded by a tubular cryostat serving for guiding a cooling agent, and which is surrounded at its end by a housing containing a cooling agent through which an electrical connection to the outside is guided for its electrical connection (EP 1 617 537 B1).

Description of Related Art

A superconductive cable has at least one electrical conductor of a material which at sufficiently low temperatures changes over into the superconductive state. The electrical direct current resistance of an appropriately constructed conductor is zero at sufficiently low temperatures as long as a certain current i.e. the critical current, is not exceeded. Suitable materials are for example, oxidic materials on the basis of rare earths (ReBCO), particularly YBCO (yttrium-barium-copper oxide), or BSCCO (bismuth-strontium-calcium-copper oxide). Sufficiently low temperatures for bringing such a compound into the superconductive state are for example, between 67K and 110K. Another suitable material is, for example, magnesium diboride which at temperatures of approximately 39K or lower changes over into the superconductive state. Suitable cooling agents are, for example, nitrogen, helium, neon and hydrogen or mixtures of these materials.

When operating a superconductive cable, the cable is arranged in a cryostat through which one of the aforementioned cooling agents is conducted. A cryostat consists essentially of at least one thermally insulated pipe. In known technology, a cryostat has, for example, two pipes made of metal arranged concentrically relative to each other at a distance from each other with a vacuum insulation arranged between the two pipes. The cable is guided at the end of a transmission path to an end closure to which the cryostat is also connected. The at least one conductor of the superconductive conductor is at the end closure thereof subjected to a cooling agent. In addition, it is constructed for constructing an electrical connection by means of a passage from the end closure.

In accordance with the above mentioned EP 1 617 537 B1, the end closure includes a housing connected to a cryostat which surrounds the end of the superconductive conductor of a cable arranged in the cryostat. The superconductive conductor is connected to an electric conductor extending out of the housing surrounded by a pipe piece insulated by a vacuum insulation which is connected to the housing. The reference does not mention anything in connection with the construction of the housing.

OBJECTS AND SUMMARY

The invention is based on the object of constructing the above mentioned end closure is such a way that all electrical and thermal requirements are met.

In accordance with the invention, this object is met, in that the housing has two walls which are separated from each other and consist of insulating material in whose intermediate space a thermal insulation containing gas is arranged, in that the pressure in the intermediate space in the housing is adjusted to a value between $10^{-9}$ mbar and 1000 mbar, and in that a pressure measuring device and a vacuum pump connected thereto are connected to the intermediate space which only serve for adjusting the pressure in the intermediate space of the housing to a predetermined value.

The housing of this end closure consists, for electrical reasons, of insulation material, for example, a glass fiber reinforced synthetic material. The two walls of the housing are advantageously made, for manufacturing reasons, of at least two parts located next to each other. The housing is additionally connected, through sealed connecting elements, to the cryostat surrounding the superconductive cable. Finally, also for conducting the superconductive conductor through the walls of the housing, appropriate sealing means are provided. As a result of leaks of the sealing means, gas could reach to all above described positions in the intermediate space of the housing or, possibly also could be discharged from the housing. This is also particularly true for the cooling agent surrounding the superconductive conductor, which may be for example pressurized liquid nitrogen, which can then change over to the gaseous state when it emerges from the cooling space or is discharged from the inner wall of the housing and conducted into the intermediate space.

The intermediate space of the housing also contains an electrically insulating thermal insulation which contains gas. For electrical reasons, the pressure in the intermediate space should be as high as possible, while it should be as low as possible for thermal reasons. Independent of the actual pressure prevailing in the intermediate space, the pressure would be increased by gaseous cooling agents entering the space.

Taking into consideration the two desirable pressures in the sense discussed above, according to the invention a pressure is adjusted which is between $10^{-9}$ mbar and 1000 mbar in the intermediate space of the housing. Advantageously, it is adjusted to approximately 400 mbar. The vacuum pump keeps the pressure at a predetermined value. For this purpose, the pressure is continuously measured by means of a pressure measuring device connected to the intermediate space of the housing. In dependence on the tightness of the housing, including all described connecting locations, the vacuum pump is switched on in stages which are spaced over several shorter or longer intervals.

In accordance with a preferred embodiment of the end closure, the intermediate space of the housing is connected to a container whose volume is large in comparison to the volume which is assumed by the gas in the intermediate space of the housing. The container can advantageously be arranged between the housing of the end closure or the intermediate space of the same and the vacuum pump. The volume of the container should advantageously be at least greater by the factor "10" than the volume in the intermediate space of the housing. The container significantly increases the quantity of the gas to be kept at the stated pressure without creating any additional, possibly untight, locations. This accomplishes the switching on of the vacuum pump less frequently with longer intervals.

A valve each can be mounted between the housing and the vacuum pump or between the container and the vacuum pump, which are each opened depending on the switching on of the vacuum pump.

BRIEF DESCRIPTION OF DRAWINGS

Embodiments of the subject matter of the invention are illustrated in the drawings.

DETAILED DESCRIPTION

The cryostat mentioned in the following may consist only of a thermally insulated pipe of metal, preferably of high grade steel. However, it may also consist of two pipes of metal which are arranged concentrically and at a distance from each other, with a vacuum insulation mounted therebetween. The superconductive cable has at least one superconductive conductor. However, it can also have two or three superconductive conductors between which a vacuum insulation is arranged. The superconductive cable has at least one superconductive conductor. However, it can also have two or three superconductive conductors which are insulated relative to each other and which are advantageously co-axially arranged relative to each other. The superconductive cable may also advantageously comprise an electrically conductive screen.

For simplicity's sake in the following description, a cable with only one superconductive conductor is considered. Walls of the cryostat and the enclosure are represented by only one line.

Figure 1:
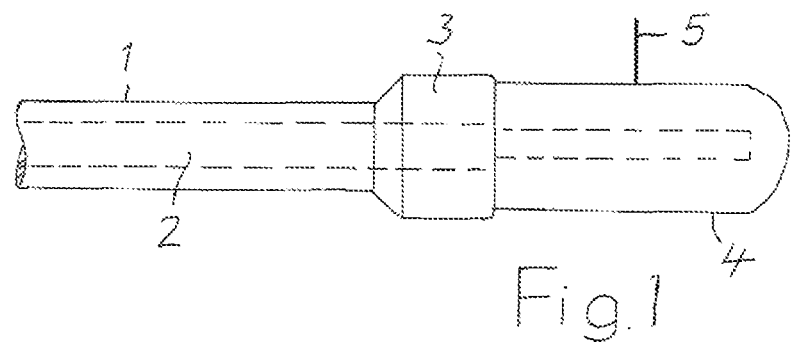
FIG. 1 is a schematic illustration of the end of a transmission path with a superconductive cable including an end closure.
Figure 2:
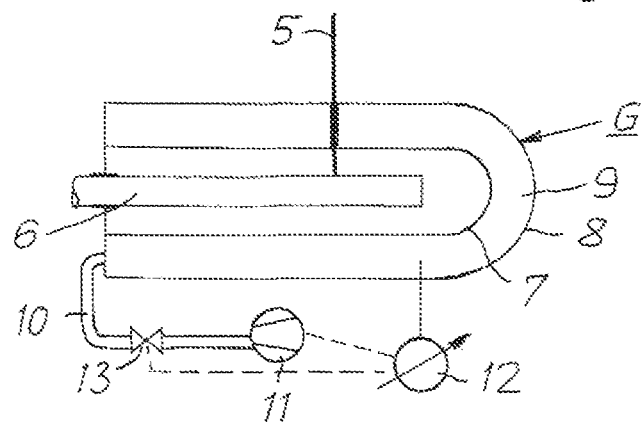
FIG. 2 is a more accurate schematic illustration of an end closure according to the invention.
Figure 3:
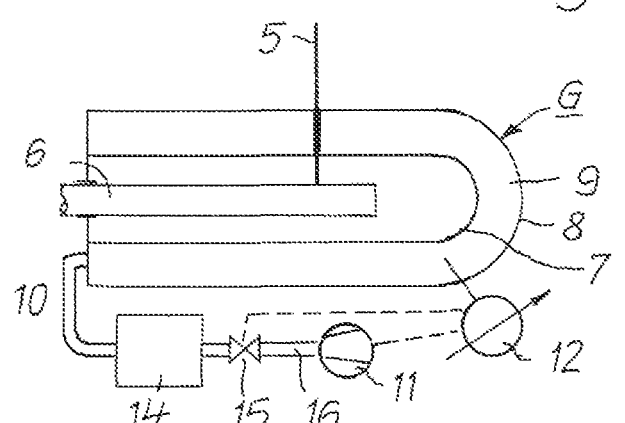
FIG. 3 shows an embodiment of the enclosure which is supplemented as compared to FIG. 2.

In FIG. 1 a cryostat 1 is schematically illustrated which encloses a superconductive cable 2 shown in broken lines. The cryostat 1 is closed off by an expansion 3 belonging to the cryostat. Attached to the expansion is an end closure 4 whose more concise construction can be seen in FIGS. 2 and 3. A passage 5 schematically illustrates a cryostat 1 which surrounds a superconductive cable 2 shown in broken lines. The cryostat 1 is closed off by an expansion 3 to which is attached an end closure 4 whose more precise construction is illustrated in FIGS. 2 and 3. A passage 5 protrudes out of the end closure 4, which serves for the electrical connection of the superconductive conductor 6 (FIGS. 2 and 3) of the cable 1.

The superconductive conductor 6 freed from all surrounding layers of the cable 1 extends into the end closure 4. It is subjected to a flow of cooling agent, for example, pressurized liquid nitrogen, and is conducted during the operation of the transmission path through the cryostat.

The end closure 4 has a housing G which is composed of two walls 7 and 8 which are spaced apart from each other by an intermediate space 9. In accordance with the illustrations of FIGS. 2 and 3, the walls 7 and 8 may preferably consist of insulation material, preferably of glass fiber reinforced synthetic material. They are sealed and are connected to the expansion 3 of the cryostat 1. The cooling means are located in the space surrounded by the inner wall 7 of the end closure 4. Passage 5 is connected to the superconductive conductor 6. It extends through both walls 7 and 8 of the end closure 4.

A gas containing insulation, which may also for the most part consist of a solid body or solid bodies, is arranged in the intermediate space 9 between the two walls 7 and 8 of the housing G. It also has good electrical insulating properties. The insulation can consist of, for example, a foamed insulation material or of a plurality of synthetic components or other electrically insulating materials, such as for example, glass, constructed, for example, as spheres.

In the intermediate space 9 of the housing G, a pressure is adjusted which is between $10^{-9}$ mbar and 1000 mbar. Preferably a pressure of 400 mbar is produced. For this purpose, a vacuum pump 11 is connected to the intermediate space 9 which may be connected directly or, in accordance with the drawing, through a pipeline 10 to the intermediate space 9. The length of such a pipeline 10 is variable. The value of the pressure is measured throughout the operation of the transmission path by means of a pressure measuring device 12 which may possibly provide a signal for switching the vacuum 11 on and off. If a pipeline 10 is used, an additional valve 13 may be mounted between the housing G and the vacuum pump 11, which is opened and closed by a signal of the measuring device 12, which may produce a signal for switching the vacuum pump 11 on and off. Using the arrangement according to FIG. 2, the pressure in the intermediate space 9 of the housing G can be adjusted to a predetermined value within narrow limits.

In accordance with a preferred embodiment, the intermediate space 9 of the housing G is connected to a container which constitutes an additional volume. Such a container may be connected directly to the intermediate space. However, in accordance with the embodiment illustrated in FIG. 3, the container can also be connected as a separate container 14 to the housing G of the end closure 4, namely between the housing G and the vacuum pump 11. However, the container 14 may also be connected, as illustrated in FIG. 3, through the pipeline 10 directly to the intermediate space 9 of the housing G. The container 14 encloses a volume which is large in relation to the volume of the gases of the housing G contained in the intermediate space 9. The volume of the container 14 is advantageously greater than the volume of the gas contained in the intermediate space 9, at least by a factor of 10. Accordingly, the intermediate space 9 and the container 14 are connected to each other through the pipeline 10, so that the gas present in the end closure 4 has a significantly increased volume. Accordingly, small quantities of gas entering the housing G of the end closure 4, or created in the housing G by gasification of the materials, have a reduced effect on the pressure prevailing in the intermediate space 9, so that the vacuum pump 11 has a reduced effect on the pressure prevailing in the intermediate space 9, so that vacuum pump 11 only has to be switched on and off in significantly increased intervals. Also, in this embodiment of the end closure 4 a valve 15 may be arranged in a pipeline 16 which connects the container 14 to the vacuum pump 11.

The gas contained in the intermediate space 9 of the housing G advantageously is a gas which corresponds to the cooling agent conducted in the cryostat 1 of the transmission path.

The invention claimed is:

1. An end closure for a superconductive electrical cable, said superconductive electrical cable having at least one superconductive conductor and being surrounded by a tubular metal cryostat containing a cooling agent, said cryostat terminating in an expansion of said cryostat, said end closure comprising:

a housing made of two walls separated from each other by an intermediate space, the walls being made of insulating material, and where said intermediate space is filled with an insulating gas cooling agent, said end closure being sealed to an outside of said expansion of said cryostat, wherein said housing surrounds an end of said superconductive conductor that extends outside of said cryostat beyond said expansion of said cryostat, and through which a bushing connected to the conductor extends outwardly, wherein:

a pressure in the intermediate space of the housing is set at a value between $10^{-9}$ mbar and 1000 mbar, the intermediate space is connected to a container whose volume is larger as compared to the volume of the gas contained in the intermediate space, a pressure measuring device and a vacuum pump connected to the measuring device are connected to the intermediate space, which serve for adjusting the pressure to a predetermined value prevailing in the intermediate space of the housing, and the container is arranged between the housing and the vacuum pump.

2. End closure according to claim 1, wherein the volume of the container is larger at least by the factor "10" of the volume of the gas contained in the intermediate space of the housing.

3. End closure according to claim 1, wherein the vacuum pump is connected to the intermediate space through a pipeline.

4. End closure according to claim 3, wherein a valve is arranged in the pipeline.

5. End closure according to claim 1, wherein the container and the vacuum pump are connected to each other through a pipeline.

6. End closure according to claim 5, wherein a valve is arranged in the pipeline.

7. End closure according to claim 1, wherein the insulating gas cooling agent contained in the intermediate space of the housing is of same type as said cooling agent present in the cryostat.

* * * * *